US012548304B2

(12) United States Patent
Choi et al.

(10) Patent No.: US 12,548,304 B2
(45) Date of Patent: Feb. 10, 2026

(54) VEHICLE AND CONTROL METHOD THEREOF

(71) Applicants: Hyundai Motor Company, Seoul (KR); Kia Corporation, Seoul (KR)

(72) Inventors: Jong Hyun Choi, Seoul (KR); Junsik An, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 452 days.

(21) Appl. No.: 18/081,433

(22) Filed: Dec. 14, 2022

(65) Prior Publication Data

US 2024/0005647 A1    Jan. 4, 2024

(30) Foreign Application Priority Data

Jun. 29, 2022  (KR) .................. 10-2022-0079756

(51) Int. Cl.
*G06V 10/776* (2022.01)
*G06T 7/55* (2017.01)
*G06V 10/764* (2022.01)
*G06V 10/774* (2022.01)
*G06V 20/58* (2022.01)
(Continued)

(52) U.S. Cl.
CPC .............. *G06V 10/776* (2022.01); *G06T 7/55* (2017.01); *G06V 10/764* (2022.01); *G06V 10/774* (2022.01); *G06V 20/58* (2022.01); *G06V 20/70* (2022.01); *G06V 40/10* (2022.01); *G06T 2207/20081* (2013.01); *G06T 2207/30196* (2013.01); *G06T 2207/30252* (2013.01)

(58) Field of Classification Search
CPC ................... G06V 20/56; G06V 20/58; G06T 2207/30252; G06T 2207/30261; B60W 2420/403
See application file for complete search history.

(56) References Cited

U.S. PATENT DOCUMENTS

| 10,607,093 B2 | 3/2020 | Kumar et al. |
| 11,978,181 B1* | 5/2024 | Pieper ................... G06T 11/001 |
| 2015/0248586 A1* | 9/2015 | Gaidon .................. G06V 20/40 |
| | | 382/103 |

FOREIGN PATENT DOCUMENTS

| JP | 2001101592 A | 4/2001 |
| KR | 10-2019-0000843 A | 1/2019 |
| KR | 102031635 B1 | 10/2019 |

(Continued)

*Primary Examiner* — Raphael Schwartz
(74) *Attorney, Agent, or Firm* — Banner & Witcoff, Ltd.

(57) ABSTRACT

A method includes obtaining primary image data comprising first image data and second image data; performing labeling on the primary image data, determining the primary image data as training data and determining the labeled image data as validation data, training, based on the training data and the validation data, a first deep learning model where the first image data and the second image data are not distinguished from each other, training, based on a weight of the first deep learning model and based on the training data and the validation data, a second deep learning model where the first image data and the second image data are distinguished from each other according to different views associated with a plurality of cameras, and recognizing, based on the second deep learning model, an object in an image associated with the primary image data, wherein the object is in proximity to the vehicle.

17 Claims, 12 Drawing Sheets

FRONT IMAGE

212
LABELING TOOL

LABELED FRONT IMAGE

SIDE IMAGE

↕D
LABELED SIDE IMAGE

(51) Int. Cl.
*G06V 20/70* (2022.01)
*G06V 40/10* (2022.01)

(56) References Cited

FOREIGN PATENT DOCUMENTS

| KR | 102105954 B1 | 4/2020 |
|----|--------------|--------|
| KR | 102099265 B1 | 5/2020 |
| KR | 102194591 B1 | 12/2020 |
| KR | 102212229 B1 | 2/2021 |

* cited by examiner

< BEFORE UPDATING >

< AFTER UPDATING >

< BEFORE UPDATING >

< AFTER UPDATING >

VEHICLE AND CONTROL METHOD THEREOF

CROSS-REFERENCE TO RELATED APPLICATION

This application claims priority to Korean Patent Application No. 10-2022-0079756, filed on Jun. 29, 2022, and all the benefits accruing therefrom under 35 U.S.C. § 119, the contents of which in its entirety are herein incorporated by reference.

BACKGROUND

An advanced driver-assistance system (ADAS) and an autonomous driving system are may be used for vehicles. In such systems, an object may be recognized based on a camera. However, to ensure the safety of the autonomous driving, the autonomous driving system with little driver intervention must have the performance to identify objects and accurately recognize objects.

To this end, an algorithm for controlling various situations or variables may be required. Accordingly, a deep learning algorithm with an artificial neural network structure that imitates a human neural network structure capable of analyzing various features from a lot of data may be applied to autonomous driving.

However, a deep learning algorithm applied to image processing may only identify objects from images, and may not consider the importance of a pedestrian in proximity to a vehicle, thereby resulting in misrecognition or an avoidance control error.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the disclosure is to provide a deep learning model updating algorithm for increasing a nearby pedestrian recognition rate and to provide an algorithm to improve an object recognition function of a camera.

A vehicle may comprise: a sensor comprising a plurality of cameras, wherein the sensor is configured to obtain primary image data comprising first image data and second image data; and a controller comprising at least one processor configured to: perform labeling on the primary image data to generate labeled image data; determine the primary image data as training data and the labeled image data as validation data; train, based on the training data and the validation data, a first deep learning model where the first image data and the second image data are not distinguished from each other; train, based on a weight of the first deep learning model and based on the training data and the validation data, a second deep learning model where the first image data and the second image data are distinguished from each other according to different views of the plurality of cameras; and recognize, based on the second deep learning model, an object in an image associated with the primary image data, wherein the object is in proximity to the vehicle.

The controller may be configured to: generate, based on at least one camera parameter associated with the plurality of cameras, a distance value table; obtain, based on the distance value table, a distance between the vehicle and the object; and assign the distance to the primary image data.

The controller may be configured to, based on the distance satisfying a threshold value, classify the primary image data as a nearby pedestrian image, wherein the object comprises a pedestrian.

The controller may be configured to assign location information of a first camera, of the plurality of cameras, to the first image data and assign location information of a second camera, of the plurality of cameras, to the second image data.

The controller may be configured to distinguish, based on the location information of the first camera, the first image data from the second image data, and perform training to recognize, based on each of the first image data and the second image data, the object.

The controller may be configured to: obtain the second deep learning model and test data; obtain a pedestrian proximity image from the test data; increase, based on a false negative (FN) result or a false positive (FP) result in the pedestrian proximity image, an evaluation index by one; and after a test for the second deep learning model is completed, apply, based on the evaluation index being lower than a pre-determined value, the second deep learning model to an autonomous driving system.

The controller may be configured to: obtain the second deep learning model and test data; obtain second images other than a pedestrian proximity image from the test data; calculate an average precision of the second images; and apply, based on the calculated average precision being higher than a pre-determined average precision, the second deep learning model to an autonomous driving system.

A control method performed by a vehicle may comprise: obtaining primary image data comprising first image data and second image data; performing labeling on the primary image data to generate labeled image data; determining the primary image data as training data and determining the labeled image data as validation data; training, based on the training data and the validation data, a first deep learning model where the first image data and the second image data are not distinguished from each other; training, based on a weight of the first deep learning model and based on the training data and the validation data, a second deep learning model where the first image data and the second image data are distinguished from each other according to different views associated with a plurality of cameras; and recognizing, based on the second deep learning model, an object in an image associated with the primary image data, wherein the object is in proximity to the vehicle.

The performing of the labeling on the primary image data may comprise: generating, based on at least one camera parameter associated with the plurality of cameras, a distance value table; obtaining, based on the distance value table, a distance between the vehicle and the object; and assigning the distance to the primary image data.

The performing of the labeling on the primary image data may comprise, based on the distance satisfying a threshold value, classifying the primary image data as a nearby pedestrian image, wherein the object comprises a pedestrian.

The performing of the labeling on the primary image data may comprise assigning location information of a first camera, of the plurality of cameras, to the first image data and assigning location information of a second camera, of the plurality of cameras, to the second image data.

The training of the second deep learning model may comprise: distinguishing, based on the location information of the first camera, the first image data from the second image data; and performing training to recognize, based on each of the first image data and the second image data, the object.

The method may further comprise obtaining the second deep learning model and test data; obtaining a pedestrian proximity image from the test data; increasing, based on a false negative (FN) result or a false positive (FP) result in the pedestrian proximity image, an evaluation index by one; and after a test for the second deep learning model is completed, applying, based on the evaluation index being lower than a pre-determined value, the second deep learning model to an autonomous driving system.

The method may further comprise obtaining the second deep learning model and test data; obtaining second images other than a pedestrian proximity image from the test data; calculating an average precision of the second images; and applying, based on the calculated average precision being higher than a pre-determined average precision, the second deep learning model to an autonomous driving system.

These and other features and advantages are described in greater detail below.

DETAILED DESCRIPTION

Figure 1:
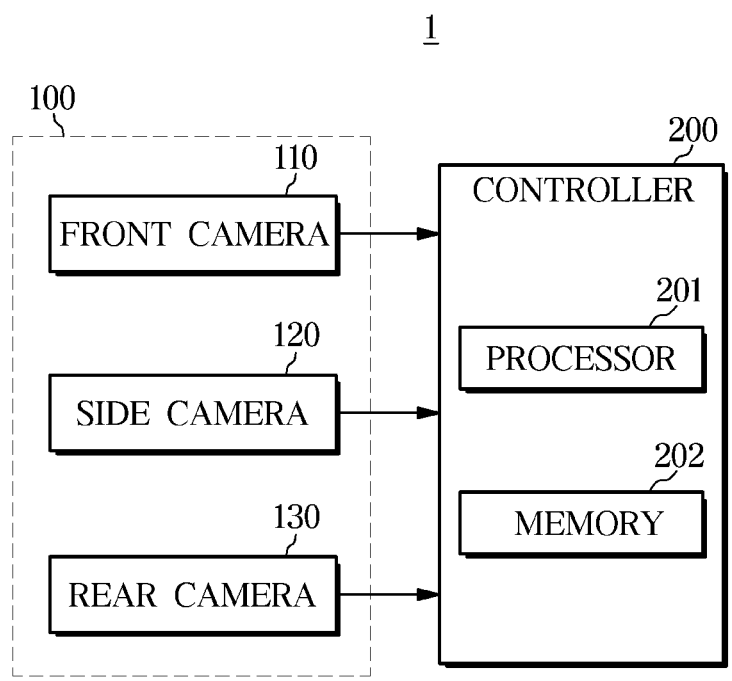
FIG. 1 is a control block diagram of a vehicle.

The same reference numerals denote the same elements throughout the specification. Not all elements of embodiments are not described in the specification, and descriptions of matters well known in the art to which the disclosure pertains or repeated descriptions may not be given. The term " . . . unit", " . . . module", " . . . member", or " . . . block" may be implemented in software and/or hardware, and a plurality of " . . . units", " . . . modules", " . . . members", or " . . . blocks" may be implemented in a single element or a single " . . . unit", " . . . module", " . . . member", or " . . . block" may include a plurality of elements.

Also, in the present specification, it will be understood that when a part is "connected" to another part, the part may be directly or indirectly connected to the other part, and the indirect connection includes connection via a wireless communication network.

When a part "includes" an element, another element may be further included, rather than excluding the existence of the other element, unless otherwise described.

When a member is referred to as being "on" another member, it may be directly on the other member, or intervening members may be present therebetween.

While such terms as "first," "second," etc., may be used to describe various elements, the above terms are used only to distinguish one element from another.

The singular forms "a," "an," and "the" are intended to include the plural forms as well, unless the context clearly indicates otherwise.

Reference numerals used in operations are used to identify the operations, without describing the order of the operations, and the operations may be performed in an order different from the stated order unless a specific order is definitely specified in the context.

Hereinafter, operation principles and various examples of the disclosure will be described in detail with the accompanying drawings.

Figure 2:
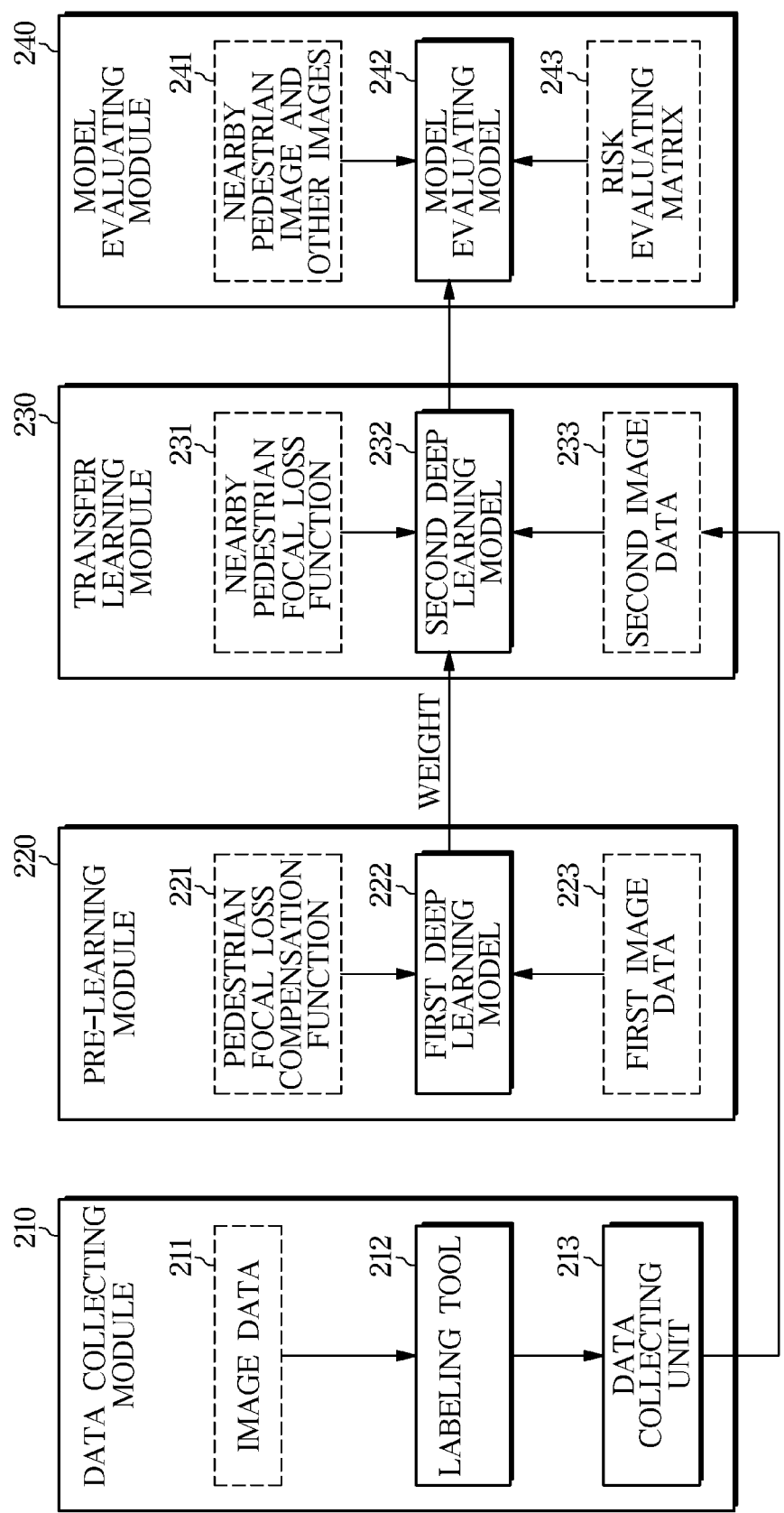
FIG. 2 is a diagram of a system for performing deep learning model updating.

FIG. 1 is a control block diagram of a vehicle. FIG. 2 is a diagram of a system for performing deep learning model updating.

A vehicle 1 may include one or more sensors (e.g., a sensor unit 100) including a front camera 110, side cameras 120, and a rear camera 130 to implement an autonomous driving system, and a controller 200 for performing image processing based on a signal transmitted from the sensor unit 100.

Although FIG. 1 shows the sensor unit 100 including only cameras, it will be understood that a radar and/or a lidar may be mounted together in addition to the cameras, to recognize an object by using a sensor fusion method. A sensor fusion method may use a plurality of sensors to detect an object. For example, sensed data from a plurality of sensors (e.g., radars, lidars, cameras, etc.) to construct a single model and/or an image (e.g., an image of the outside of a vehicle), and an object in an image may be detected based on the sensed data and the constructed model.

The front camera 110 may be provided on a front windshield and/or a front bumper, in order to capture a front view of the vehicle 1. The front camera may detect an object moving in a front view, and/or may detect an obstacle in a front corner view. The front camera 110 may transmit a front image signal obtained in a front view to the controller 200, so that the controller 200 processes the front image signal to generate front image data.

The side cameras 120 may be symmetrically provided on B fillers or the like, in order to capture side views of the vehicle 1. The side cameras 120 may be provided on left and right sides of the vehicle 1, and may detect a moving object travelling in parallel next to the vehicle 1, and/or may detect a pedestrian approaching the vehicle 1. The side cameras 120 may transmit a side image signal obtained from a side view to the controller 200, so that the controller 200 processes the side image signal to generate side image data.

The rear camera 130 may be provided on a rear windshield and/or a rear bumper, in order to capture a rear view of the vehicle 1. The rear camera may detect an object moving in a rear view, and/or may detect an obstacle in a rear corner view. The rear camera 130 may transmit a rear image signal obtained in a rear view to the controller 200, so that the controller 200 processes the rear image signal to generate rear image data.

Although the sensor unit 100 described above includes four cameras, aspects of the disclosure are not limited thereto, and in order to improve recognition performance, the sensor unit 100 may include more cameras such as 6 channels, 8 channels, or 12 channels. Also, a location of each camera may be changed to secure an optimal view according to a structure of the vehicle 1.

The sensor unit 100 may include a plurality of lenses and image sensors. The sensor unit 100 may include a wide-angle camera, and may secure/capture all-round views with respect to the vehicle 1.

The sensor unit 100 may have camera intrinsic parameters determined for each manufacturer. For example, the camera intrinsic parameters may include a focal length, a principal point, and a skew coefficient. Also, the sensor unit 100 may have camera extrinsic parameters determined according to a physical location of a camera. For example, the camera extrinsic parameters may include a camera installation height and a direction (pan, tilt).

The controller 200 may obtain an actual distance between the vehicle 1 and an object based on a distance value table to which a ground reference distance value of each pixel may be assigned by using the camera intrinsic parameters according to the sensor unit 100.

The controller 200 may include a processor (e.g., an image signal processor), such as a processor 201, for processing image data of the sensor unit 100, and a microcontrol unit (MCU) for generating an acceleration/deceleration signal, a braking signal, and/or a steering signal based on an image data processing result.

If image information (or image data) is received from the sensor unit 100 during an autonomous driving mode, the controller 200 may recognize lanes of a road by performing image processing, may recognize a lane in which the vehicle 1 travels based on location information of the recognized lanes, may determine whether both lane markers of the lane in which the vehicle 1 travels are recognized, and may control autonomous driving based on the both lane markers after it determines that the both lane markers are recognized.

The controller 200 may identify objects in an image based on image information obtained by the sensor unit 100 during autonomous driving, and may determine whether the objects in the image are fixed obstacles or moving obstacles by using a deep learning algorithm of the disclosure.

The controller 200 may obtain location information (and/or a direction, such as a direction of the location of the object from the vehicle 1, a moving direction of an object, etc.) and type information (e.g. another vehicle, a pedestrian, a cyclist, a curb, a guardrail, a street tree, or a street lamp) of an obstacle ahead of the vehicle 1 based on image data of the sensor unit 100.

The controller 200 may obtain an actual distance between the vehicle 1 and an object for each direction based on image data of the sensor unit 100.

The memory 202 may store a program and/or data for processing image data, a program and/or data for processing radar data, and a program and/or data using which the processor 201 generates a braking signal and/or a warning signal.

The memory 202 may temporarily store image data received from the sensor unit 100 and an image data processing result.

The memory 202 may include at least one of, but not limited to, a non-volatile memory device such as a cache, a read-only memory (ROM), a programmable ROM (PROM), an erasable programmable ROM (EPROM), an electrically erasable programmable ROM (EEPROM) or a flash memory, a volatile memory such as a random-access memory, and/or a storage medium such as a hard disk drive (HDD), or a compact disc (CD)-ROM.

One or more aspects of the disclosure is to optimize a nearby pedestrian recognition performance of a wide-angle camera system for each camera direction on a real road by using a loss function considering the importance of an object (e.g., a pedestrian) and interpretable transfer learning.

Referring to FIG. 2, a system for performing deep learning model updating may include a data collecting module 210, a pre-learning module 220, a transfer learning module 230, and a model evaluating module 240.

The data collecting module 210 may be a module for recognizing a location and a type of an object around a vehicle through the sensor unit 100 to process the same into deep learning model training data. The data collecting module 210 may obtain image data 211 in multiple directions through the sensor unit 100 mounted on the vehicle 1, generate ground truth (GT) about the image data 211 by using a labeling tool 212, and store the GT in a data collecting unit 213.

The labeling tool 212 may generate a bounding box as GT according to determined rules to determine a desired answer in advance for a model to be trained. The bounding box may be a rectangular boundary that surrounds a nearest pedestrian in an image. The labeling tool shows whether a pedestrian in an image is a pedestrian in proximity to the vehicle 1, and a direction of the image (e.g., the location of a camera) is assigned to image data.

The data collecting module 210 may recognize a location and information of an object in an image as a two-dimensional (2D) box. Alternatively or additionally, the data collecting module 210 may recognize a location and information of an object as semantic segmentation, a cylindrical shape, or the like, and may change a recognition result according to a type of the object.

A labeling process and a data collecting process may be automatically performed by using a well-known algorithm, and/or may be manually performed by using a specific program.

The pre-learning module 220 may extract the image data 211 from the data collecting unit 213 and train a first deep learning model 222 regardless of a direction of a camera included in the sensor unit 100. The pre-learning module 220 may train the first deep learning model 222 by comparing the image data 223 obtained by the front camera 110, the side camera 120, or the rear camera 130 with the GT derived by the data collecting unit 213 regardless of a direction (e.g., a direction of a captured image associated with a location of a camera). The pre-learning module 220 may perform training by using an omnidirectional image of the vehicle 1 as input data by using a pedestrian focal loss compensation function 221. The pedestrian focal loss compensation function 221 will be described with reference to FIG. 6.

The transfer learning module 230 may classify data stored in the data collecting unit 213 according to directions, and use the data to train a second deep learning model 232 that performs directional image recognition deep learning corresponding to each direction. The second deep learning model 232 may receive and use a weight transferred from the first deep learning model. An encoder weight of the first deep learning model 222 may be frozen to maintain feature extraction performance, so that feature extraction performance of the second deep learning model 232 may be maintained to perform optimization in each direction. A nearby pedestrian focal loss function may be applied to train the second deep learning model 232. The nearby pedestrian focal loss function will be described with reference to FIG. 8. The second deep learning model 232 may receive a weight transferred from the first deep learning model 222 and may maintain pedestrian recognition performance in an image. The second deep learning model 232 may be trained to more accurately determine a nearest pedestrian according to a direction of a camera by additionally considering a direction of the sensor unit 100.

The model evaluating module 240 may evaluate the second deep learning model 232, and determine whether the model for which training is completed is to be applied to an autonomous driving system or is to be retrained. The model evaluating module 240 may determine whether the second deep learning model is to be loaded onto an autonomous driving system or is to be retrained. The model evaluating module 240 may extract the same number of nearby pedestrian images and other images 241 in which a nearby pedestrian does not exist in the data collecting unit 213 and use the images for model evaluation 242. The model evaluating module 240 may use a risk evaluating matrix 243 to evaluate the completeness of the model by using a misrecognition or unrecognition ratio which may cause dangerous situations in the nearby pedestrian images.

Elements for implementing the disclosure and an operation of each element have been described. A data collecting process to a model evaluating process will now be described in detail with reference to FIGS. 3 to 10.

Figure 3:
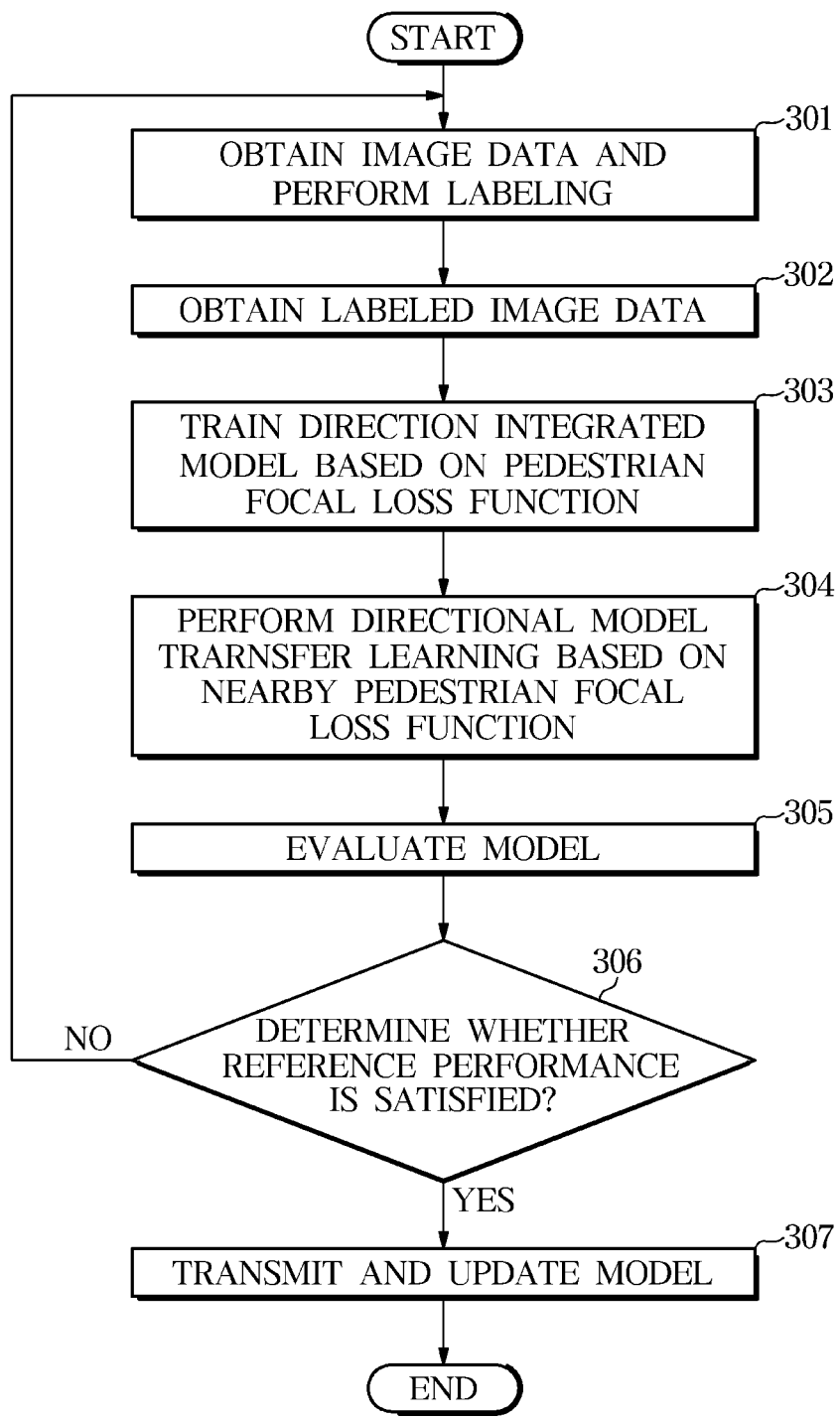
FIG. 3 is a flowchart illustrating a control method of a vehicle.

FIG. 3 is a flowchart illustrating a control method of a vehicle.

Figure 4:
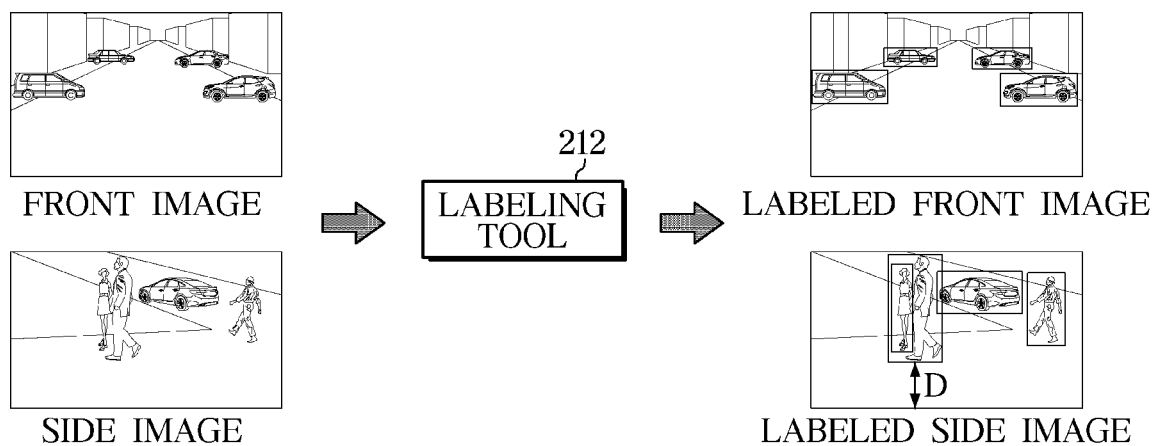
FIG. 4 illustrates a labeling process.

The controller 200 (e.g., shown in FIG. 1) may obtain image data from the sensor unit 100 while the vehicle 1 travels, and perform labeling (301). The controller 200 may perform labeling on image data as to whether there is a nearby pedestrian as well as existing object labeling (e.g., semantic segmentation or object box). FIG. 4 illustrates a labeling process. A bounding box is assigned to a pedestrian or another vehicle by the labeling tool 212 in a front image, a rear image, and/or a side image. The controller 200 may store direction information of a camera along with the bounding box and information indicating whether it is a high-risk scene because a pedestrian is in a nearest location along with a label.

The controller 200 may obtain labeled image data (302), and determine the image data before labeling as training data and the labeled image data as validation data.

The controller 200 may train the first deep learning model 222, which may be a direction integrated model based on a pedestrian focal loss function (303).

After labeling is completed, the controller 200 may classify and store the training data and the validation data in the data collecting unit 213, and train the first deep learning model 222. In the first deep learning model, a single model may be trained regardless of which direction camera inputs a scene. An encoder of the direction integrated model may focus more on feature extraction of a pedestrian through the pedestrian focal loss function.

The controller 200 may perform a directional model transfer learning process based on a nearby pedestrian focal loss function (304). The controller 200 may train the second deep learning model 232, which may be a directional transfer learning model by using a weight used to train the first deep learning model 222.

After the direction integrated model is trained, the controller 200 may receive an encoder and a weight transferred from the direction integrated model and train the second deep learning model 232, which may be a directional model. The controller 200 may perform training by focusing more on a nearby pedestrian through a decoder of each direction by using the nearby pedestrian focal loss function. As described above, because the weight of the encoder of the direction integrated model may be frozen so as not to change a parameter by training, the encoder trained with a large amount of image data with integrated directions does not cause forgetting (e.g., erasing one or more learned parameters and/or learned data).

The controller 200 may output a deep learning model optimized for nearby pedestrian recognition for each direction through operations 303 and 304, and evaluate the output model (305). The controller 200 may evaluate the output model and determine whether to update the model.

If the output model satisfies a reference performance (306), the controller 200 may transmit the model for which training is completed to an autonomous driving system and perform a model update (307). If the output model does not satisfy the reference performance, the controller 200 may use a scene in which there is an erroneous braking or a risk of collision as retraining data.

An overall algorithm according to the disclosure has been described. Each of a data collecting process, a pre-learning process, a transfer learning process, and a model evaluating process will now be described in more detail.

Figure 5:
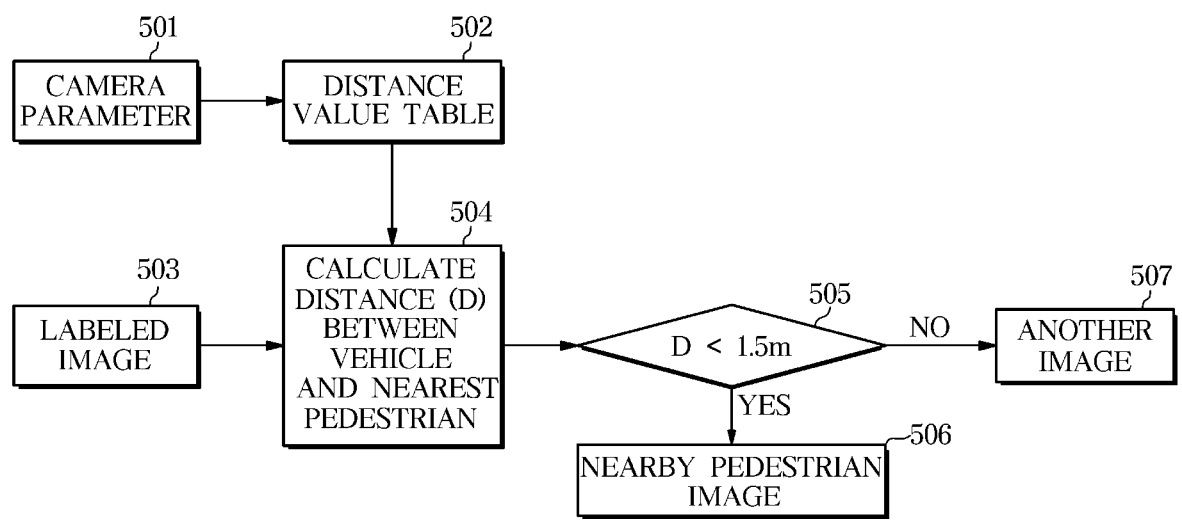
FIG. 5 illustrates a process of classifying a nearby pedestrian image and another image after labeling.

FIG. 5 illustrates a process of classifying a nearby pedestrian image and another image after labeling.

The data collecting module 210 (see FIG. 2) may identify whether an image is a nearby pedestrian image or another image. The sensor unit 100 (see FIG. 1) may include multiple cameras, and each camera may have a camera parameter. The controller 200 may calculate a distance value table to which a ground reference distance value of each pixel in an image is assigned through a camera parameter 501 in a labeled image 503. The controller 200 may calculate a distance D (see e.g., FIG. 4) between the vehicle 1 and a nearest pedestrian by using the distance value table (504). The controller 200 may extract the distance D based on a lowest midpoint of a bounding box for the nearest pedestrian from among objects existing in the image. If the distance between the nearest pedestrian and the vehicle 1 is equal to or less than a reference value (e.g., 1.5 m or any other value) (505), the controller 200 may determine that the image is a nearby pedestrian image 506, and otherwise, the controller 200 may store the image as another image 507. A setting criterion in operation 505 may be freely designated by a user.

Figure 6:
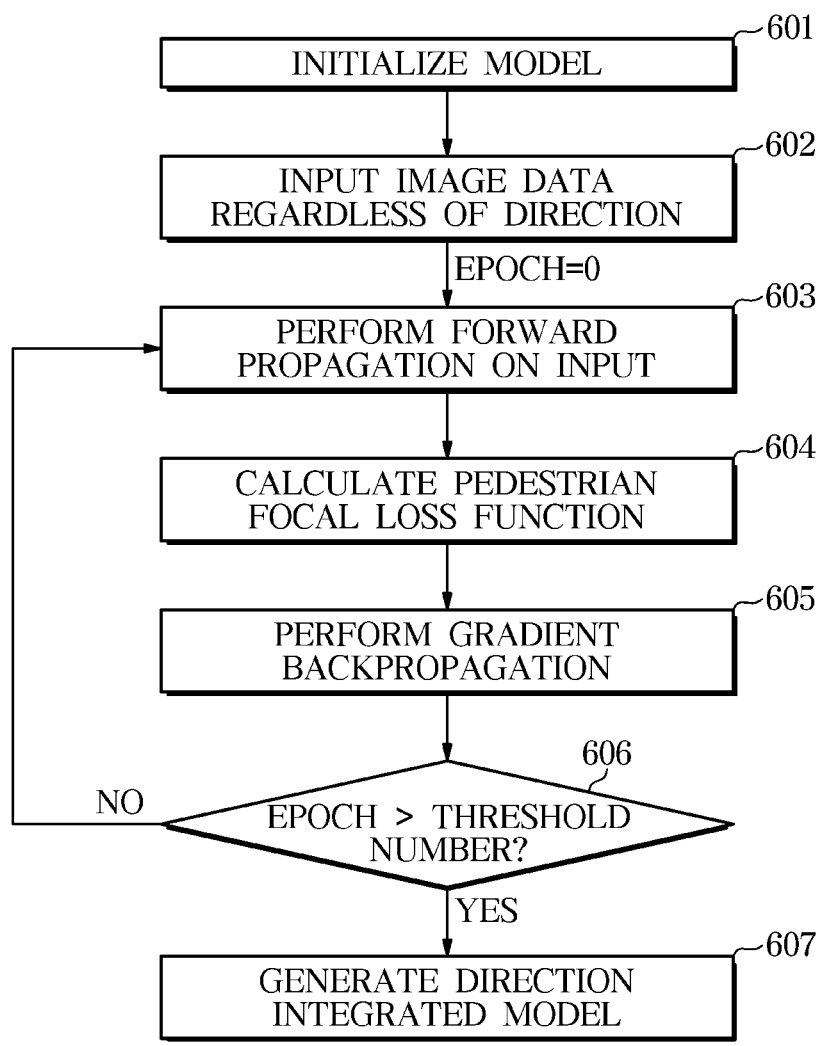
FIGS. 6 and 7 illustrate a pre-learning process in a deep learning model.
Figure 7:
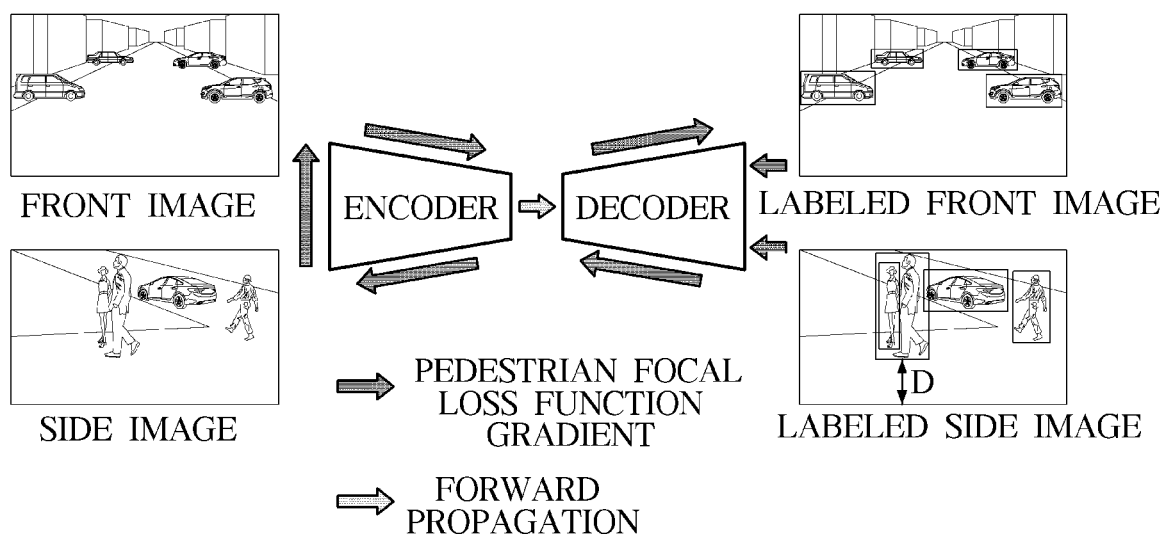

FIGS. 6 and 7 illustrate a pre-learning process in a deep learning model.

In a pre-learning process, a direction integrated image recognition model may be trained with a model parameter for minimizing a pedestrian focal loss function by using a gradient descent method. Training of the first deep learning model 222 (see FIG. 2) may be performed by integrally receiving an image regardless of a direction, calculating a difference between an output of the first deep learning model 222 and an actual label value through a pedestrian focal loss function, and performing backpropagation.

The controller 200 may initialize a model used for image recognition in an existing autonomous driving system (601). The controller 200 may input image data regardless of a direction to the initialized model to be trained (602).

The controller 200 may output a location and a type of an object through forward propagation on training data in the data collecting unit 213 (see FIG. 2) (603). The controller 200 may calculate a difference between the output and an actual label through the pedestrian focal loss function (604). For example, the controller 200 may determine performance of the model to be trained by applying unlabeled input data and labeled validation data to the pedestrian focal loss function.

The pedestrian focal loss function may be defined as in Equation 1.

$$L = \sum_0^N -\alpha_i\{(1-p_i)^\gamma \log(p_i) + p_i^\gamma \log(1-p_i)\}$$ [Equation 1]

The pedestrian focal loss function L may be a function in which a concentration $\alpha_i$ that is a weight is assigned to a focal loss, and refers to an indicator of how well the model is trained to distinguish a pedestrian. The concentration $\alpha_i$ may be defined as in Equation 2.

$$\alpha_i = \left(\frac{\frac{1}{n_c}}{\sum \frac{1}{n_k}} * \min\left(\frac{1}{n_c}\right)^{-1}\right)^{\delta_c},$$ [Equation 2]

$\delta_c = 2$ if $c ==$ pedestrian, else 1

According to Equation 2, the concentration is a ratio between a reciprocal of the number of instances of each class and a reciprocal of the number of all class instances. If an object is a pedestrian, $\delta=2$ may be input and a relatively high value may be obtained. If an object is not a pedestrian, $\delta=1$ may be input and a relatively low value may be obtained.

Accordingly, the controller 200 may correct a class imbalance problem between a vehicle and a pedestrian by using a method of calculating a reciprocal of the number of instances. The controller 200 may perform training by providing a change of $\delta$ to the concentration of the pedestrian. If the model is trained by using the above method, training may be performed by primarily focusing on pedestrian feature extraction in a feature extraction process. The focal loss that is the basis of the pedestrian focal loss function may be changed according to a recognition task. The controller 200 may focus on a pedestrian, by applying the concentration $\alpha_i$ to a value obtained from each object, and the first deep learning model may be trained regardless of a task.

The controller 200 may train a model with a parameter by performing backpropagation on a gradient of a nearby pedestrian focal loss function (605). Referring to FIG. 7, the controller 200 may update a weight of the first deep learning model by performing forward propagation without distinguishing a front image from a side image through an encoder which is an input sequence, and perform retraining with a new weight by performing backpropagation without distinguishing a labeled front image from a labeled side image through a decoder which is an output sequence.

The controller 200 may determine whether an epoch reaches a threshold number by repeatedly performing the above training process (606), and generate a final direction integrated model when the epoch exceeds the threshold number (607). An epoch (e.g., in machine learning) may be one complete pass of the training dataset through an algorithm (e.g., the number of passes of the entire training dataset the algorithm has completed).

Figure 8:
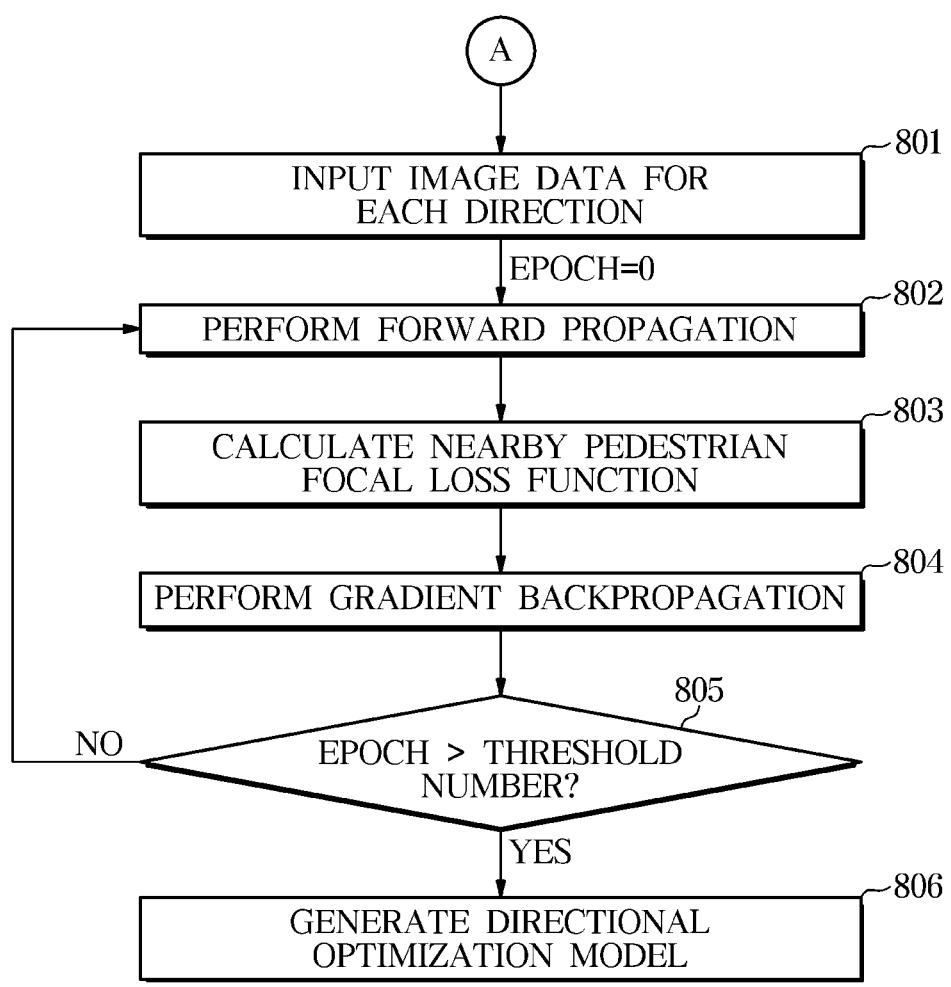
FIGS. 8 and 9 illustrate a transfer learning process in a deep learning model.
Figure 9:
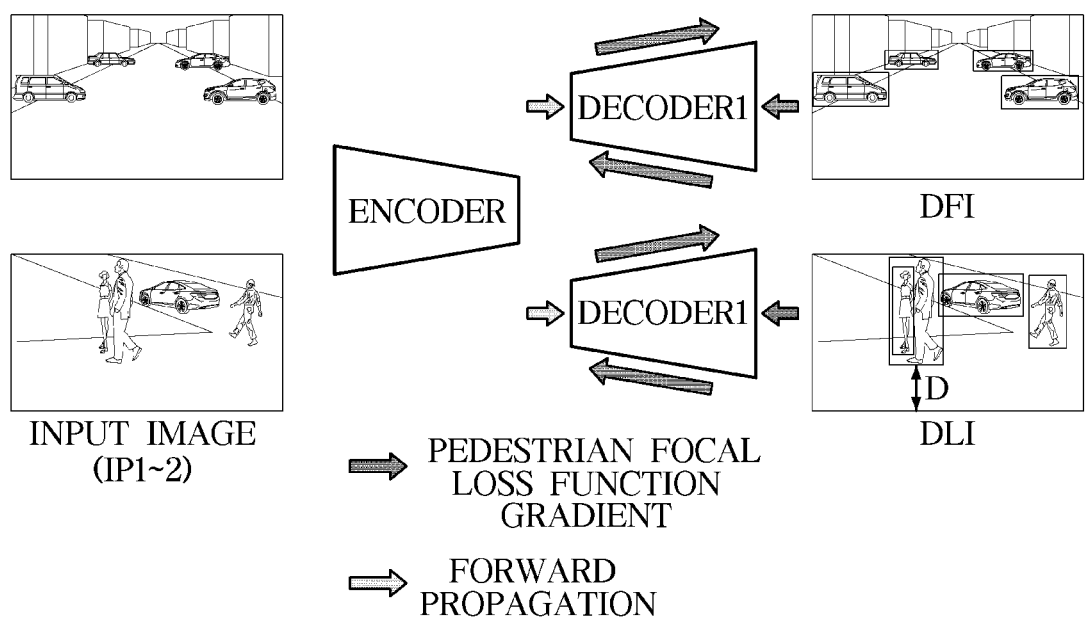

FIGS. 8 and 9 illustrate a transfer learning process in a deep learning model.

Transfer learning according to FIG. 8 may be performed to further improve pedestrian recognition performance according to a location of each camera after a pre-learning process of FIG. 6. The controller 200 may receive a weight transferred from pre-learning and use the weight for transfer learning. The controller 200 may freeze an encoder of a model so as not to change a parameter.

Referring to FIG. 9, a directional optimized image recognition model of transfer learning may be trained with a model parameter for minimizing a nearby pedestrian focal loss function by using a gradient descent method according to each direction. For example, in a state where each of a front image and a side image is individually input to a model, the model may be transferred through an encoder, and may be frozen, and training may be performed through each decoder.

Referring to FIG. 8, the controller 200 may input image data for each direction (801). An image that is training data may correspond to an image in which a direction of a camera is labeled.

The controller 200 may individually perform training with respect to each direction, and may oversample a nearby pedestrian image and a labeled image with respect to each direction so that each model is sufficiently trained with the nearby pedestrian image.

The controller 200 may perform forward propagation on the training data (802), calculate a nearby pedestrian focal loss function (803), and perform gradient backpropagation (804).

For example, the controller 200 may perform backpropagation until an epoch configured with a gradient of a loss function and the nearby pedestrian focal loss function exceeds a threshold number (805).

The nearby pedestrian focal loss function of the disclosure may be determined according to Equation 3. The nearby pedestrian focal loss function may be formed by adding a proximity concentration $\beta_i$ and the proximity concentration may be determined according to Equation 4.

$$L = \sum_0^N -\alpha_i\beta_i\{(1-p_i)^\gamma \log(p_i) + p_i^\gamma \log(1-p_i)\}$$ [Equation 3]

$$\beta_i = \frac{\sqrt{S_i}}{\frac{1}{N_c}\sum\sqrt{S_i^c}},$$ [Equation 4]

$S_i, = (x_{max} - x_{min}) * (y_{max} - y_{min})$, $S^c$: by class $S_i$,

It is found that the proximity concentration increases in proportion to a square root of a size of a bounding box. This is divided by an average of bounding box sizes for each class, to eliminate the influence of distribution of box sizes for each class, and an average of $\beta_i$ is set to 1, not to affect an overall loss function scale. Using Equation 4, because a size of a bounding box increases as proximity increases in a specific class, a model has a higher weight $\beta_i$, and a loss function focuses more on a nearby pedestrian along with $\alpha_i$ of Equation 2.

Concentrations of loss functions of FIGS. 6 and 8 are separately provided in the disclosure. This is because, when $\beta_i$ is used as a concentration in a pre-learning process, an encoder may extract features that are invariant with respect to a scale. In a pre-learning process, only the concentration $\alpha_i$ is used to maximize pedestrian feature extraction performance regardless of a scale, and in a subsequent transfer learning process, training may be performed by focusing on a nearby object through a decoding part of an actual location.

The controller 200 may repeatedly perform the above learning process and determine whether an epoch reaches a threshold number (805). If the epoch exceeds the threshold number, the controller 200 may generate a final directional optimization model (806).

Each loss function used in pre-learning and transfer learning may be applied after being changed according to a task of a deep learning model. For example, if an object recognition task is to estimate a three-dimensional (3D) bounding box, a template of a loss function may be changed to a mean squared error (MSE) loss. In this process, a method of calculating each concentration $\alpha_i$ or $\beta_i$ may be performed by applying an element-wise operation to each loss function.

In transfer learning, a frozen part of an encoder may be changed according to a user's selection. For example, an encoder may not be frozen till a specific epoch of transfer learning is determined, and after the specific epoch being determined, the encoder may be frozen or only some layers of the encoder may be frozen.

If a deep learning model by pre-learning and transfer learning described above is finally established, the controller 200 may test whether to load the deep learning model onto an autonomous driving system. The vehicle 1 may determine whether the deep learning model that has undergone a series of algorithms through a test process of FIG. 10 is suitable for image processing such as collision risk determination.

Figure 10:
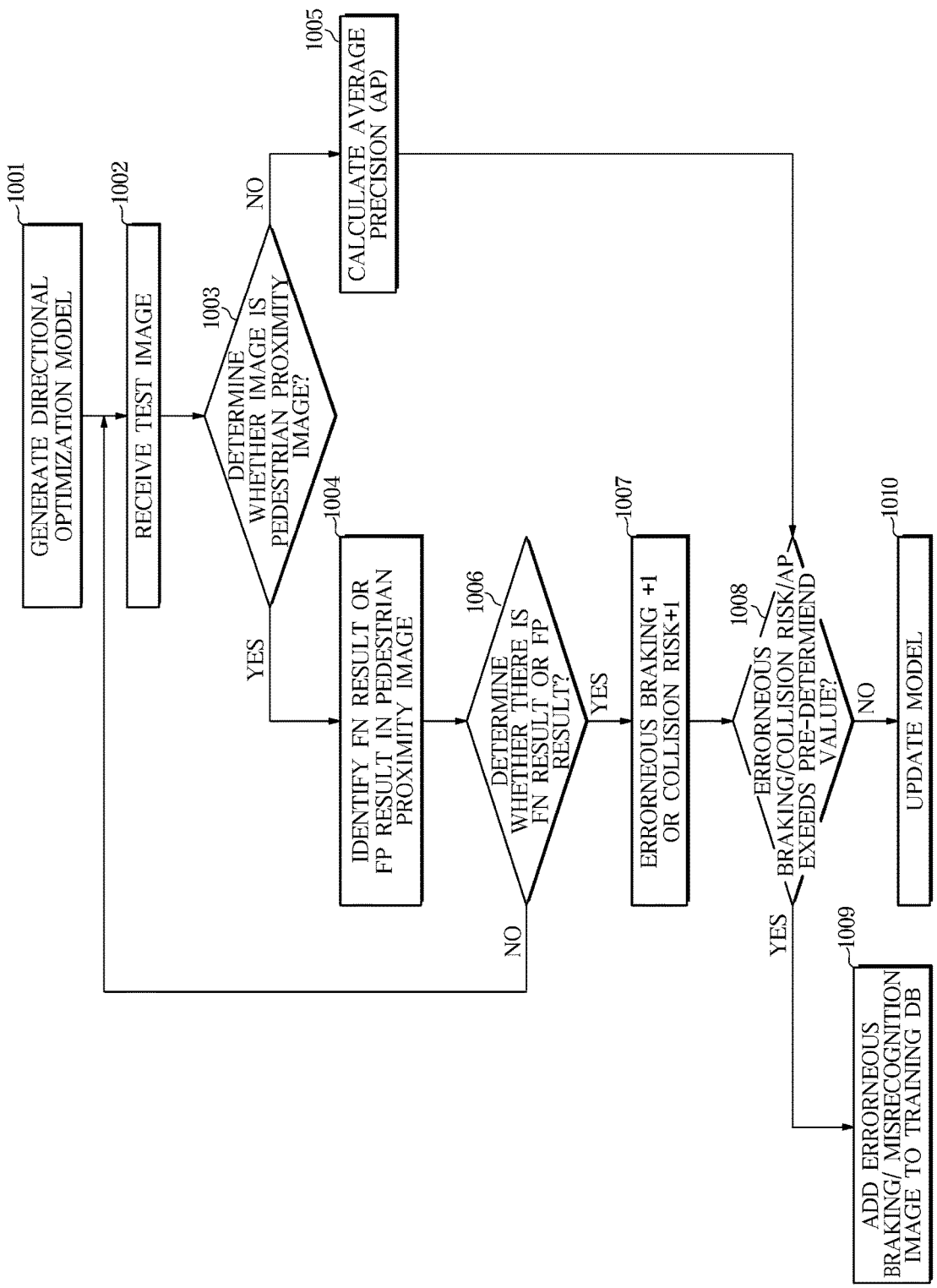
FIG. 10 illustrates a test process for a trained deep learning model.

FIG. 10 illustrates a test process for a trained deep learning model.

The controller 200 may receive the second deep learning model 232 (see FIG. 2), which may be a directional optimization model and a test image (1001, 1002).

The controller 200 may determine whether there is a nearby pedestrian in an image in all test images stored in the data collecting unit 213 (1003). This may be because the controller 200 previously performs labeling on image data and metadata is assigned.

If a test image is a pedestrian proximity image, the controller 200 may determine whether there are a false negative (FN) result and/or a false positive (FP) result in the test image (1004), and if the test image is not a pedestrian proximity image, the controller 200 may calculate an average precision (AP) for each class to determine object distinction performance of an algorithm (directional optimization model) (1005).

If there is an FN result, the controller 200 may increase an erroneous braking index by +1, and if there is an FP result, the controller 200 may increase a collision risk index by +1 (1007). The controller 200 may determine an accuracy of the directional optimization model through a final value of the erroneous braking index and/or the collision risk index.

After model evaluation for the test image is completed, if the erroneous braking index/collision risk index is lower than a pre-determined value and the AP is higher than a pre-determined value (1008), the controller 200 may determine that the accuracy of the model is sufficient and update the model so that the model generated by processes of FIGS. 6 and 8 is applied to an autonomous driving system (1010).

If a condition in operation 1008 is not satisfied (e.g., if the erroneous braking index/collision risk index is not lower than a pre-determined value and the AP is lower than or equal to a pre-determined value), the controller 200 may perform the algorithm described herein again by adding an erroneous braking/misrecognition image to a training database and re-applying from a process of the data collecting module 210 (e.g., as an initial step), and perform model training until the condition of operation 1008 is satisfied.

Unlike an existing evaluation algorithm, model evaluation described herein may individually evaluate nearby pedestrian collision preventing performance that is an objective of a real wide-angle camera and erroneous braking prevention performance, and an image recognition deep learning model may be automatically updated according to the model evaluation, thereby increasing an object recognition rate in an autonomous driving system and reducing dangerous situations.

Figure 11:
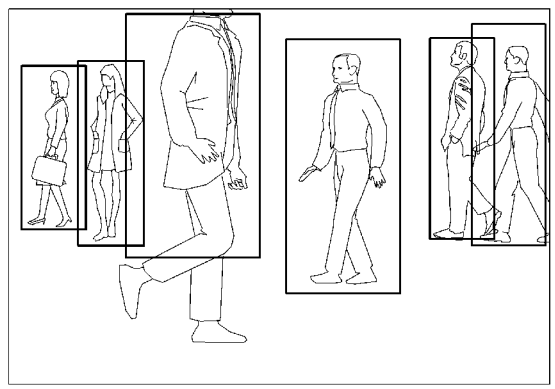
FIGS. 11 and 12 illustrate an example of improved image recognition.
Figure 11:
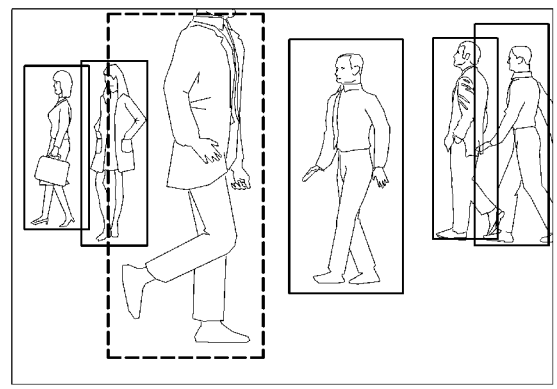
Figure 12:
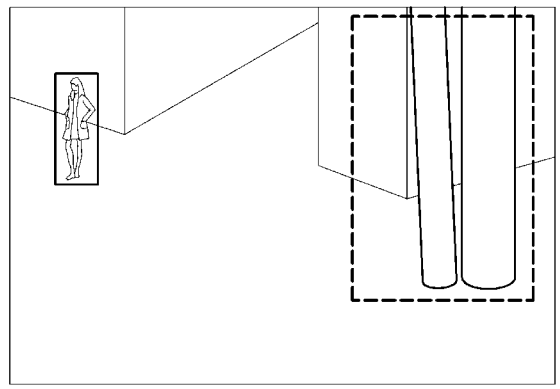
Figure 12:
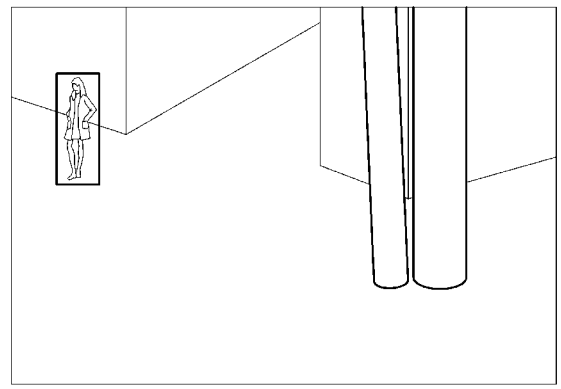

FIGS. 11 and 12 illustrate an example of improved image recognition.

Referring to FIG. 11, in the past (before updating), a nearest pedestrian may not be recognized or misrecognized due to characteristics of a wide-angle camera. However, according to a deep learning model (after updating) of the disclosure, recognition performance of a pedestrian near to the vehicle has been improved.

Also, as shown in FIG. 12, according to the disclosure, because pedestrian recognition performance is improved, erroneous braking caused by misrecognition of an obstacle as a pedestrian may be prevented.

As described above, according to the disclosure, because recognition performance distribution according to a location and a field of view of a camera is considered, optimization in each direction in a transfer learning step may be achieved, and because training is simultaneously performed with image data in all directions in a pre-learning step, training data reduction occurring when data is classified by directions may be achieved.

According to an aspect of the disclosure, the accuracy and reliability of autonomous driving may be improved by improving nearby pedestrian recognition performance.

A vehicle may include a sensor unit including a plurality of cameras having different views, the sensor unit being configured to obtain image data including first image data and second image data, and a controller including at least one processor configured to process the first image data and the second image data obtained by the sensor unit, wherein the controller is configured to perform labeling on the image data, and determine the image data as training data and the labeled image data as validation data, train a first deep learning model by using the training data and the validation data in a state where the image data is not distinguished, transfer a weight of the first deep learning model to a second deep learning model, and train the second deep learning model by using the training data and the validation data in a state where the image data is distinguished according to a view of each camera, and recognize a pedestrian near to the vehicle in an image obtained through the sensor unit based on the second deep learning model.

The controller may be configured to generate a distance value table based on a camera parameter provided by the camera, obtain a distance between the vehicle and the pedestrian based on the distance value table, and assign the distance to the image data.

The controller may be configured to, when the distance is equal to or less than a pre-determined length, classify the image data as a nearby pedestrian image.

The controller may be configured to assign location information of a camera corresponding to each of the first image data and the second image data to the image data.

The controller may be configured to perform training to recognize a pedestrian in the image data, without distinguishing the first image data and the second image data.

The controller may be configured to distinguish each of the first image data and the second image data based on the location information of the camera, and perform training to recognize a nearest pedestrian for each of the first image data and the second image data.

The controller may be configured to obtain the second deep learning model and test data, obtain a pedestrian proximity image from the test data, increase an evaluation index by 1 whenever there is a false negative (FN) result or a false positive (FP) result in the pedestrian proximity image, and apply the second deep learning model to an autonomous driving system when the evaluation index is lower than a pre-determined value after a test for the second deep learning model is completed.

The controller may be configured to obtain the second deep learning model and test data, obtain images other than a pedestrian proximity image from the test data, calculate an average precision of the other images, and apply the second deep learning model to an autonomous driving system when the calculated average precision is higher than a pre-determined average precision.

A control method of a vehicle may include obtaining image data including first image data and second image data, and performing labeling on the image data, determining the image data as training data and determining the labeled image data as validation data, training a first deep learning model by using the training data and the validation data in a state where the image data is not distinguished, transferring a weight of the first deep learning model to a second deep learning model, and training the second deep learning model by using the training data and the validation data in a state where the image data is distinguished according to a view of an image, and recognizing a pedestrian near to the vehicle in an image obtained through a camera based on the second deep learning model.

The performing of the labeling on the image data may include generating a distance value table based on a camera parameter provided by the camera, obtaining a distance between the vehicle and the pedestrian based on the distance value table, and assigning the distance to the image data.

The performing of the labeling on the image data may include, when the distance is equal to or less than a pre-determined length, classifying the image data as a nearby pedestrian image.

The performing of the labeling on the image data may include assigning location information of a camera corresponding to each of the first image data and the second image data to the image data.

The training of the first deep learning model may include performing training to recognize a pedestrian in the image data, without distinguishing the first image data and the second image data.

The training of the second deep learning model may include distinguishing each of the first image data and the second image data based on the location information of the camera, and performing training to recognize a nearest pedestrian for each of the first image data and the second image data.

The control method may further include obtaining the second deep learning model and test data, obtaining a pedestrian proximity image from the test image, increasing an evaluation index by 1 whenever there is a false negative (FN) result or a false positive (FP) result in the pedestrian proximity image, and applying the second deep learning model to an autonomous driving system when the evaluation index is lower than a pre-determined value after a test for the second deep learning model is completed.

The control method may further include obtaining the second deep learning model and test data, obtaining images other than a pedestrian proximity image from the test data, calculating an average precision of the other images, and applying the second deep learning model to an autonomous driving system when the calculated average precision is higher than a pre-determined average precision.

Disclosed embodiment(s) may be implemented on a recording medium storing instructions executable by a computer. The Instructions may be stored as program code, and when being executed by a processor, may cause a program module to be generated and operations of the disclosed features to be performed. The recording medium may be implemented as a computer-readable recording medium.

The computer-readable recording medium includes any type of recording medium in which instructions readable by a computer are stored. Examples of the recording medium may include a read-only memory (ROM), a random-access memory (RAM), a magnetic tape, a magnetic disk, a flash memory, and an optical data storage.

Various examples have been described with reference to the attached drawings. It will be understood by one of ordinary skill in the art that the embodiment(s) may be easily modified in other specific forms without changing the technical spirit or the essential features of the disclosure. The disclosed features are non-limiting examples of the disclosure, and should be considered in a descriptive sense only and not for purposes of limitation.

What is claimed is:

1. A vehicle comprising:
    a sensor comprising a plurality of cameras, wherein the sensor is configured to obtain primary image data comprising first image data and second image data; and
    a controller comprising at least one processor configured to:
        perform labeling on the primary image data to generate labeled image data;
        determine the primary image data as training data and the labeled image data as validation data;
        train, based on the training data and the validation data, a first deep learning model where the first image data and the second image data are not distinguished from each other;
        train, based on a weight of the first deep learning model and based on the training data and the validation data, a second deep learning model where the first image data and the second image data are distinguished from each other according to different views of the plurality of cameras; and
        recognize, based on the second deep learning model, an object in an image associated with the primary image data, wherein the object is in proximity to the vehicle,
        wherein training of at least one of the first deep learning model or the second deep learning model is based on a pedestrian focal loss function based on a reciprocal of a number of instances of detected classes.

2. The vehicle of claim 1, wherein the controller is configured to:
    generate, based on at least one camera parameter associated with the plurality of cameras, a distance value table;
    obtain, based on the distance value table, a distance between the vehicle and the object; and
    assign the distance to the primary image data.

3. The vehicle of claim 2, wherein the controller is configured to, based on the distance satisfying a threshold value, classify the primary image data as a nearby pedestrian image, wherein the object comprises a pedestrian.

4. The vehicle of claim 1, wherein the controller is configured to assign location information of a first camera, of the plurality of cameras, to the first image data and assign location information of a second camera, of the plurality of cameras, to the second image data.

5. The vehicle of claim 4, wherein the controller is configured to distinguish, based on the location information of the first camera, the first image data from the second image data, and perform training to recognize, based on each of the first image data and the second image data, the object.

6. The vehicle of claim 1, wherein the controller is configured to:
obtain the second deep learning model and test data;
obtain a pedestrian proximity image from the test data;
increase, based on a false negative (FN) result or a false positive (FP) result in the pedestrian proximity image, an evaluation index by one; and
after a test for the second deep learning model is completed, apply, based on the evaluation index being lower than a pre-determined value, the second deep learning model to an autonomous driving system.

7. The vehicle of claim 1, wherein the controller is configured to:
obtain the second deep learning model and test data;
obtain second images other than a pedestrian proximity image from the test data;
calculate an average precision of the second images; and
apply, based on the calculated average precision being higher than a pre-determined average precision, the second deep learning model to an autonomous driving system.

8. A control method performed by a vehicle, the control method comprising:
obtaining, from a plurality of cameras of the vehicle, primary image data comprising first image data and second image data, wherein the first image data corresponds to a first view of a first camera of the plurality of cameras, and the second image data corresponds to a second view of a second camera of the plurality of cameras;
performing labeling on the primary image data to generate labeled image data;
determining the primary image data as training data and determining the labeled image data as validation data;
training, based on the training data and the validation data, a first deep learning model where the first image data and the second image data are not distinguished from each other according to different views associated with the plurality of cameras;
training, based on a weight of the first deep learning model and based on the training data and the validation data, a second deep learning model where the first image data and the second image data are distinguished from each other according to different views associated with the plurality of cameras; and
recognizing, based on the second deep learning model, an object in an image associated with the primary image data, wherein the object is in proximity to the vehicle, wherein the second deep learning model is trained using transfer learning,
wherein training of at least one of the first deep learning model or the second deep learning model is based on a pedestrian focal loss function based on a reciprocal of a number of instances of detected classes.

9. The control method of claim 8, wherein the performing of the labeling on the primary image data comprises:
generating, based on at least one camera parameter associated with the plurality of cameras, a distance value table;
obtaining, based on the distance value table, a distance between the vehicle and the object; and
assigning the distance to the primary image data.

10. The control method of claim 9, wherein the performing of the labeling on the primary image data comprises, based on the distance satisfying a threshold value, classifying the primary image data as a nearby pedestrian image, wherein the object comprises a pedestrian.

11. The control method of claim 8, wherein the performing of the labeling on the primary image data comprises assigning location information of the first camera, of the plurality of cameras, to the first image data and assigning location information of the second camera, of the plurality of cameras, to the second image data.

12. The control method of claim 11, wherein the training of the second deep learning model comprises:
distinguishing, based on the location information of the first camera, the first image data from the second image data; and
performing training to recognize, based on each of the first image data and the second image data, the object.

13. The control method of claim 8, further comprising:
obtaining the second deep learning model and test data;
obtaining a pedestrian proximity image from the test data;
increasing, based on a false negative (FN) result or a false positive (FP) result in the pedestrian proximity image, an evaluation index by one; and
after a test for the second deep learning model is completed, applying, based on the evaluation index being lower than a pre-determined value, the second deep learning model to an autonomous driving system.

14. The control method of claim 8, further comprising:
obtaining the second deep learning model and test data;
obtaining second images other than a pedestrian proximity image from the test data;
calculating an average precision of the second images; and
applying, based on the calculated average precision being higher than a pre-determined average precision, the second deep learning model to an autonomous driving system.

15. The control method of claim 8, wherein the training of the first deep learning model is further based on a pedestrian focal loss compensation function, and wherein the training of the second deep learning model is further based on a nearby pedestrian focal loss function.

16. A vehicle comprising:
a sensor comprising a plurality of cameras, wherein the sensor is configured to obtain primary image data comprising first image data and second image data, wherein the first image data corresponds to a first view of a first camera of the plurality of cameras, and the second image data corresponds to a second view of a second camera of the plurality of cameras;
at least one processor; and
a memory storing at least one instruction that, when executed by the at least one processor communicating with the memory, is configured to cause the vehicle to:
determine the primary image data as training data;
perform labeling on the primary image data to generate labeled image data;
determine the labeled image data as validation data;
train, based on the training data and the validation data, a first deep learning model, wherein viewing directions of the first image data and the second image data are not distinguished from each other for the training of the first deep learning model;
train, based on a weight of the trained first deep learning model and based on the training data and the validation data, a second deep learning model, wherein the viewing directions of the first image data and the second image data are distinguished from each other, according to different views of the plurality of cameras, for the training of the second deep learning model; and recognize, based on the trained second deep learning model, an object in an image associated with the primary image data, wherein training of at least one of the first deep learning model or the second deep learning model is based on a pedestrian focal loss function based on a reciprocal of a number of instances of detected classes.

17. The vehicle of claim 16, wherein the training of the first deep learning model is based on a pedestrian focal loss compensation function, and wherein the training of the second deep learning model is based on a nearby pedestrian focal loss function.

* * * * *